United States Patent
Kitayama et al.

(10) Patent No.: US 6,659,702 B2
(45) Date of Patent: Dec. 9, 2003

(54) BOLTING STRUCTURE FOR MAGNESIUM ALLOY MEMBER

(75) Inventors: Kenichi Kitayama, Saitama (JP); Katsutoshi Ando, Saitama (JP); Yoichiro Inaba, Saitama (JP); Kozo Kusumoto, Saitama (JP); Eiji Suzuki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 256 days.

(21) Appl. No.: 09/809,209

(22) Filed: Mar. 16, 2001

(65) Prior Publication Data

US 2001/0022926 A1 Sep. 20, 2001

(30) Foreign Application Priority Data

Mar. 17, 2000 (JP) ........................ P.2000-76987

(51) Int. Cl.$^7$ ............................ F16B 43/00; F16B 43/02
(52) U.S. Cl. ....................... 411/546; 411/148; 411/537; 403/408.1
(58) Field of Search ................................ 411/136, 148, 411/531, 533, 537, 539, 546; 403/404, 408.1

(56) References Cited

U.S. PATENT DOCUMENTS

| 3,072,423 | A | * | 1/1963 | Charlton | ................. | 411/539 X |
| 3,171,518 | A | * | 3/1965 | Bergmann | ............... | 411/537 X |
| 5,147,151 | A | * | 9/1992 | Hipkins, Jr. | ............ | 411/537 X |
| 5,584,628 | A | * | 12/1996 | Bernoni | ................. | 411/537 X |
| 5,906,463 | A | | 5/1999 | Damm et al. | | |

FOREIGN PATENT DOCUMENTS

| JP | 44-7460 | | 3/1944 |
| JP | 58-196312 | A | 11/1983 |
| JP | 5-52206 | A | 3/1993 |
| JP | 5-302614 | A | 11/1993 |

OTHER PUBLICATIONS

German Office Action dated Nov. 15, 2002.

* cited by examiner

Primary Examiner—Neill Wilson
(74) Attorney, Agent, or Firm—Arent Fox Kintner Plotkin & Kahn, PLLC

(57) ABSTRACT

The present invention provides a bolting structure for a magnesium alloy member, having a non-magnesium alloy and conventional member 12 disposed on the magnesium alloy member 15, the magnesium alloy member 15 being covered with an insulator 14, and a bolt 18 initially inserted through the magnesium alloy member 15 and then into the conventional member 12, thereby permitting the conventional member 12 and the magnesium alloy member 15 to be bolted together, comprising: a washer 17 disposed between a head 18a of the bolt 18 and the magnesium alloy member 15, the washer 17 having a boss 16 disposed thereon, wherein the magnesium alloy member 15 is formed with a through-hole 13 that is greater in diameter than a bolthole 19 of the washer 17. The above boss 16 and through-hole 13 eliminate a chance that the bolt 18 contacts the through-hole 13. The insulator 14 remains intact because of non-contact of the bolt 18 with the through-hole 13 so that no stray current corrosion occurs.

8 Claims, 10 Drawing Sheets

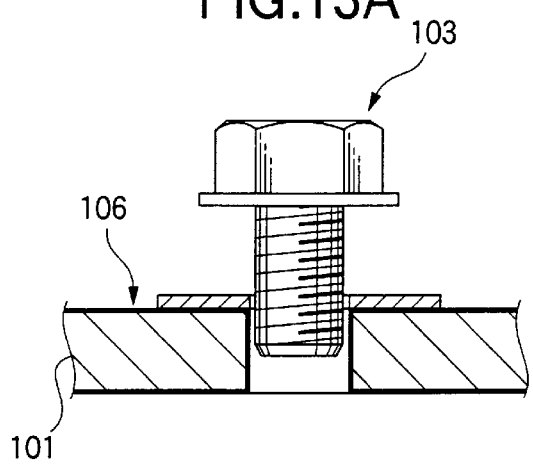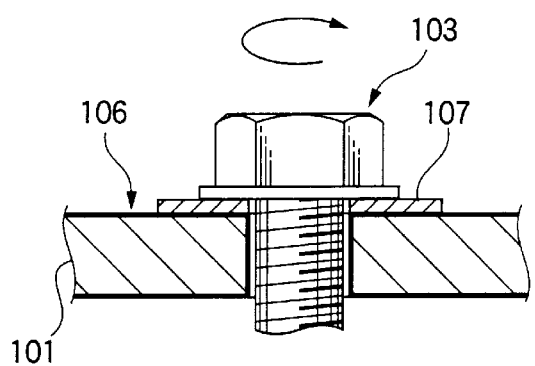

BOLTING STRUCTURE FOR MAGNESIUM ALLOY MEMBER

BACKGROUND OF THE INVENTION

1. Field of the Invention

The present invention relates to improvements in a bolting structure having a non-magnesium alloy and conventional member disposed on a magnesium alloy member, the magnesium alloy member being covered with an insulator, and a bolt initially inserted through the magnesium alloy member and then into the conventional member, thereby permitting the conventional member and the magnesium alloy member to be bolted together.

2. Description of the Related Art

A magnesium alloy member is preferably used for, e.g., a reduction in weight of a vehicle because of the lightest-weight metal in practical use. A bolting structure is useful in assembling the magnesium alloy member onto a conventional member such as a steel material. However, the bolting structure suffers from problems as given below.

FIG. 12 is a cross-sectional view, illustrating a conventional bolting structure. The typical bolting structure is shown having a non-magnesium alloy and conventional member 102 disposed on a magnesium alloy member 101, and further having a bolt 103 initially inserted through the magnesium alloy member 101 and then into the conventional member 102, thereby fastening these two members 101, 102 together. The bolt 103 is a low cost hexagonal bolt made of carbon steel.

In some cases, coagulation of dew in the air between a head 104 of the bolt 103 and the magnesium alloy member 101 causes water 105 to be lodged therebetween. The magnesium alloy member 101 is the most base material in potential, and a galvanic cell is formed between the magnesium alloy member 101 and the dissimilar metal or bolt 103. As a result, an electrical current is run between the magnesium alloy member 101 and the dissimilar metal or bolt 103 through the galvanic cell, and corrosion called stray current corrosion occurs therebetween. In order to avoid such a phenomenon, the magnesium alloy member 101 must be covered with an electrically insulating material for electrically isolating the member 101 from the dissimilar metal.

FIGS. 13A and 13B illustrate conventional bolting structures having problems to be overcome.

As shown in FIG. 13A, the magnesium alloy member 101 is covered with an insulator 106 such as by plating. When the bolt 103 is inserted into the member 101, then threads (thread ridges) of the bolt 103 at a distal or lower end thereof sometimes damage the insulator 106. Such damage is often accompanied by the insertion of the bolt 103.

Once the insulator 106 is damaged, the insulator 106 at such a damaged portion thereof is deficient in insulating performance. Then, the stray current corrosion undesirably occurs thereat.

In FIG. 13B, when the bolt 103 is brought into threaded engagement with the magnesium alloy member 101 through a washer 107, then the washer 107 is rotated in union with the revolving bolt 103. The rotated washer 107 may damage the insulator 106, thereby promoting the stray current corrosion at such a damaged location.

Thus, the stray current corrosion is likely to occur, even at the magnesium alloy member 101 having the insulator 106 disposed thereon.

SUMMARY OF THE INVENTION

In view of the above, an object of the present invention is to provide a stray current corrosion-free or stray current corrosion-resistant bolting structure for a magnesium alloy member covered with an insulator.

In order to achieve the above object, the invention provides a bolting structure for a magnesium alloy member, having a non-magnesium alloy and conventional member disposed on the magnesium alloy member, the magnesium alloy member being covered with an insulator, and a bolt initially inserted through the magnesium alloy member and then into the conventional member, thereby permitting the conventional member and the magnesium alloy member to be bolted together, comprising: a washer disposed between a head of the bolt and the magnesium alloy member; and, a lateral washer displacement-proof member for preventing the washer from being laterally displaced, the lateral washer displacement-proof member being positioned either on one of the washer and the magnesium alloy member or between the washer and the magnesium alloy member, wherein the magnesium alloy member is formed with a through-hole that is greater in diameter than a bolthole of the washer.

The lateral washer displacement-proof member prevents lateral displacement of the washer mounted on the magnesium alloy member, and thereby holds the washer in desirable position. The bolt is inserted into the magnesium alloy member by being guided by the bolthole of the washer. The bolt at a distal end thereof is not likely to contact the through-hole of the magnesium alloy member because the through-hole is sufficiently greater than the bolthole. As a result, the insulator remains intact because of non-contact of the bolt with the through-hole, and no stray current corrosion occurs.

In addition, the invention provides a bolting structure for a magnesium alloy member, wherein the through-hole is any non-circular hole, including a polygonal hole, designed to lock the washer against rotation.

Since the washer rotated jointly with the bolt scratches the insulator, a member is provided for locking the washer against rotation in order to prevent the occurrence of scratches and stray current corrosion.

Further, the invention provides a bolting structure for a magnesium alloy member, wherein the lateral washer displacement-proof member is one of a boss, a cylindrical concave, and at least three protrusions, the boss being formed integrally on the washer, the boss having an outer diameter slightly smaller than a diameter of the throughhole, the cylindrical concave having a diameter slightly greater than an outer diameter of the washer, the cylindrical concave being formed in the magnesium alloy member, and the protrusions projecting outward from the magnesium alloy member in order to prevent sideward displacement of the washer. The terms "slightly smaller" and "slightly greater" as previously mentioned take account of a clearance required for conveniently assembling components together.

The boss integrally formed on the washer is engaged with the through-hole, thereby holding the washer in position, which otherwise would be moved sideward. Alternatively, the engagement of the washer with the cylindrical concave holds the washer in position, which otherwise would be displaced sideward. Furthermore, the plurality of protrusions disposed about the washer holds the washer in position, which otherwise would be displaced sideward. That is, these lateral washer displacement-proof members are applied to prevent the washer from being moved sideward or making a gap.

The invention provides a bolting structure for a magnesium alloy member, wherein the washer is affixed to the magnesium alloy member through a double-side adhesive tape.

Such a construction in which the washer is secured to the magnesium alloy member by means of the adhesive tape holds the washer in position, which otherwise would be dislodged from the magnesium alloy member, locks the washer against rotation, and provides enhanced insulating performance of the magnesium alloy member.

Furthermore, the invention provides a bolting structure for a magnesium alloy member, wherein the lateral washer displacement-proof member is a double-side adhesive tape for affixing the washer to the magnesium alloy member.

Such a construction in which the washer secured to the magnesium alloy member by means of the adhesive tape holds the washer in position, which otherwise would result in lateral displacement, rotation, and dislodgement from the magnesium alloy member.

BRIEF DESCRIPTION OF THE DRAWINGS

FIGS. 13A and 13B are illustrations showing conventional art bolting structures having problems to be overcome.

DETAILED DESCRIPTION OF THE PREFERRED EMBODIMENT

Embodiments of the present invention will now be described with reference to the attached drawings.

Figure 4:
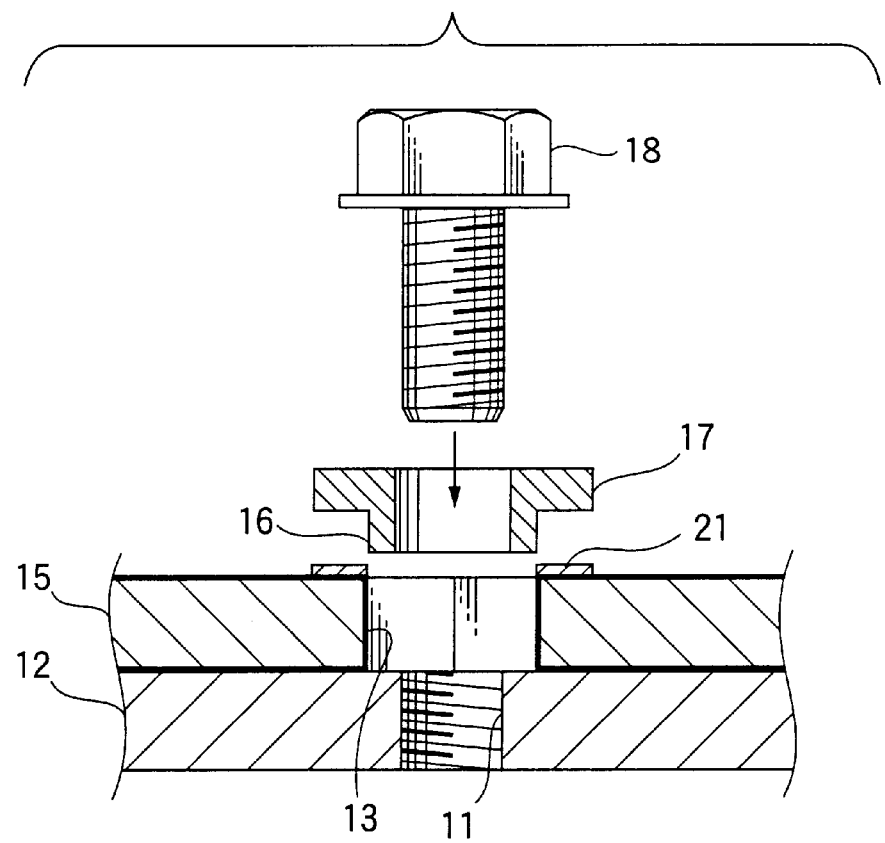
FIG. 4 is a variant of the embodiment as shown in FIG. 2.
Figure 5:
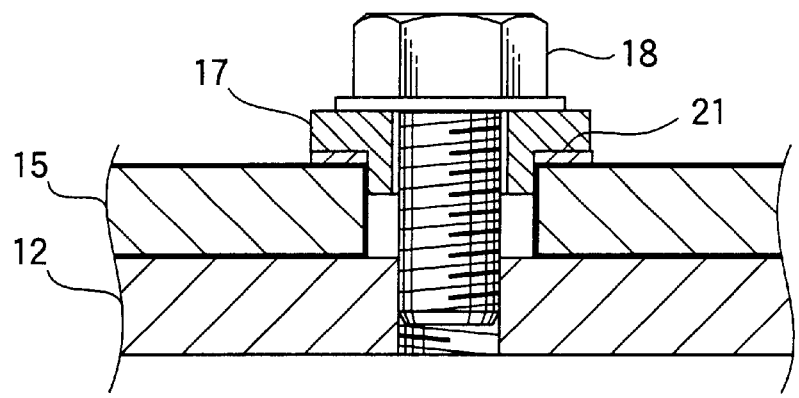
FIG. 5 is a variant of the embodiment as illustrated in FIG. 3.
Figure 10:
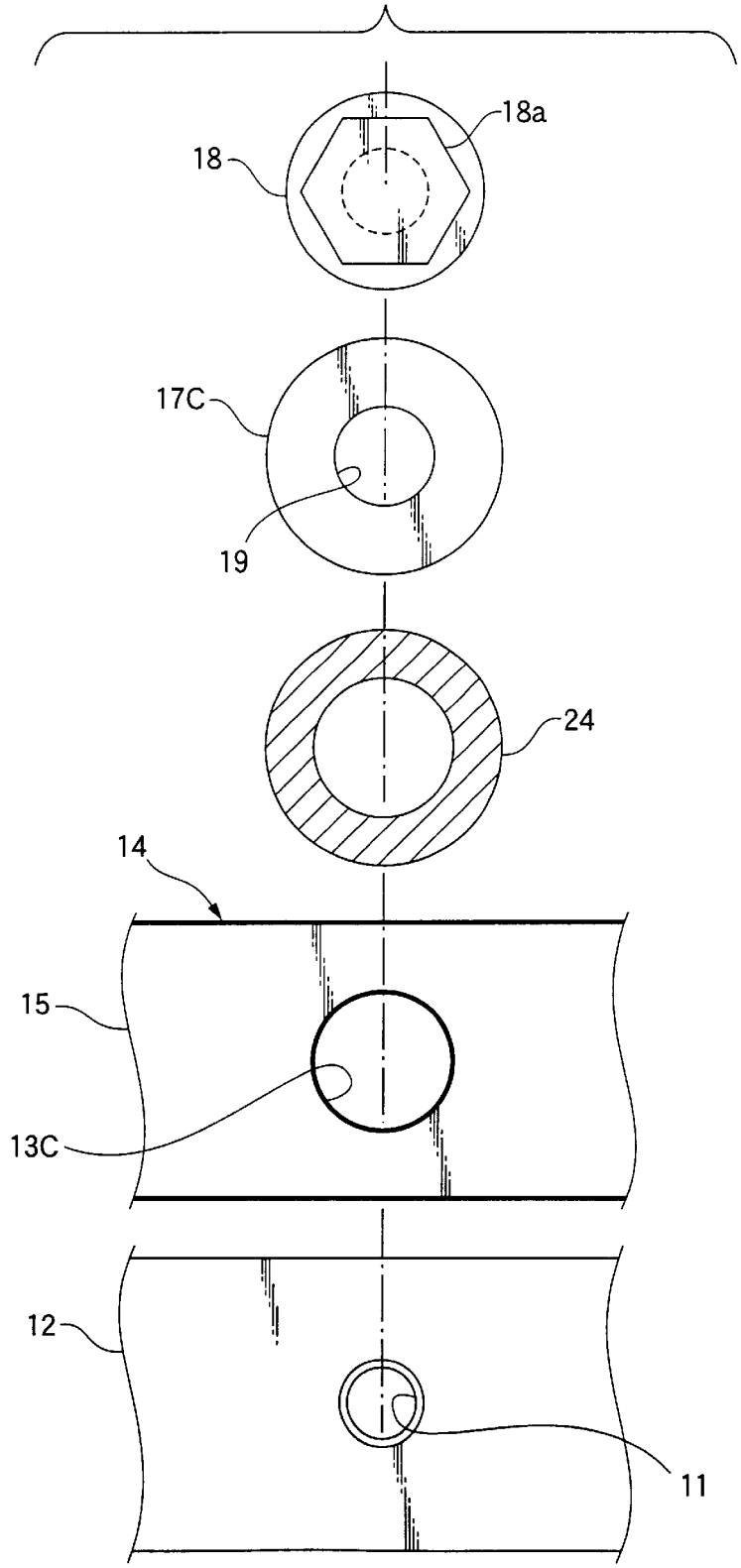
FIG. 10 is an exploded view, illustrating a bolting structure according to a fourth embodiment.
Figure 11:
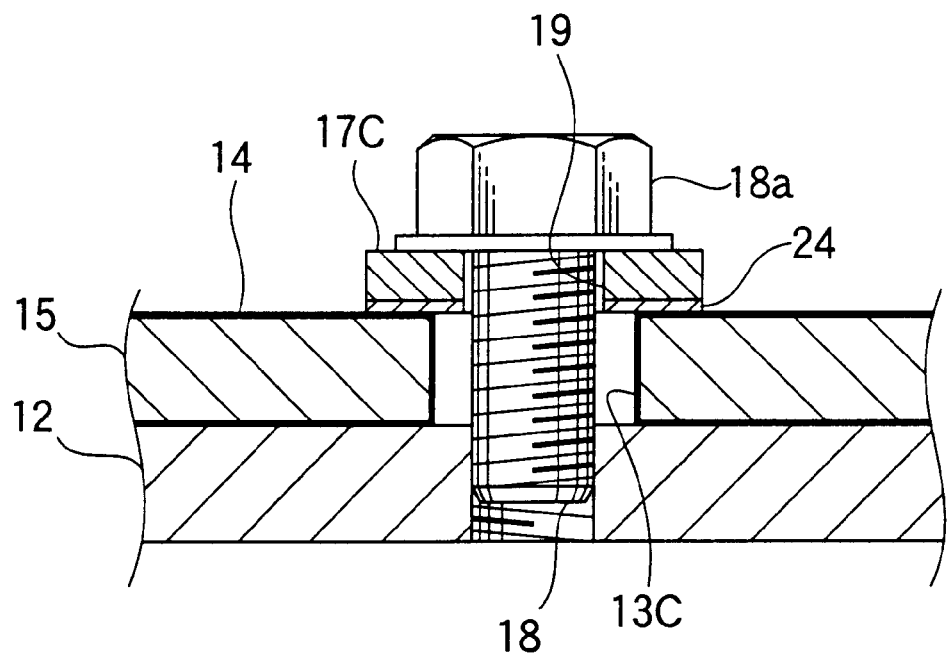
FIG. 11 is a cross-sectional view, showing the bolting structure according to the fourth embodiment.
Figure 12:
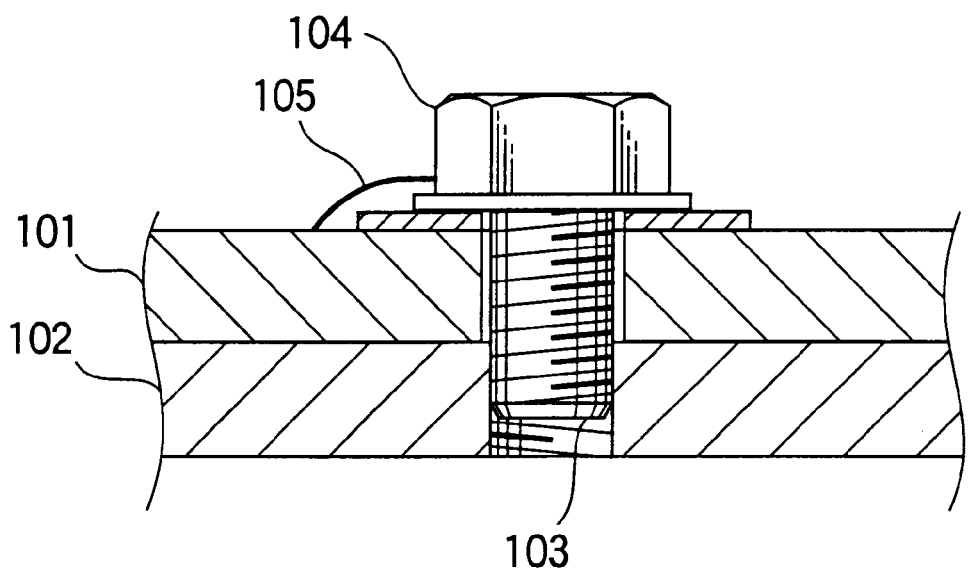
FIG. 12 is a cross-sectional view, illustrating a conventional bolting structure.

It is to be noted that FIGS. 4 and 5 illustrate one embodiment according to the invention, while FIGS. 10 and 11 illustrate another embodiment according to the invention.

Figure 1:
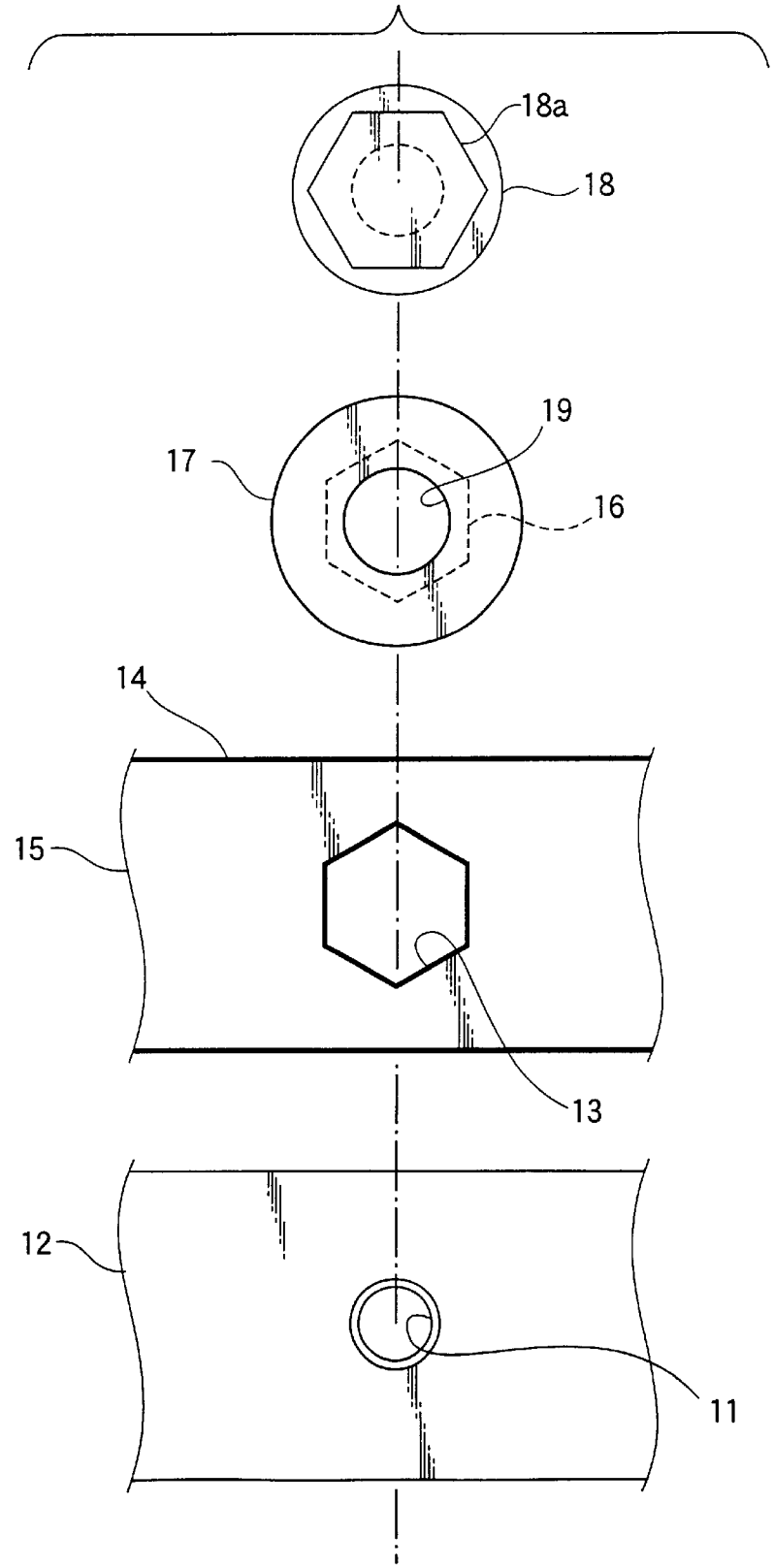
FIG. 1 is an exploded view, illustrating a bolting structure according to a first embodiment of the present invention.

FIG. 1 is an exploded view, illustrating a bolting structure according to a first embodiment of the present invention. The bolting structure according to the present embodiment includes a non-magnesium alloy and conventional member 12, a magnesium alloy member 15, a bossed washer 17, and a bolt 18. The conventional member 12 includes a threaded hole 11. The magnesium alloy member 15 includes a hexagonal through-hole 13. The through-hole 13 is sized as required. The magnesium alloy member 15 is covered with an insulator 14. In FIG. 1, the insulator 14 is shown in bold solid line, and is equally illustrated in the other drawings.

The bossed washer 17 is formed with a protruding boss portion 16. The boss portion 16 has an outer diameter slightly smaller than a diameter of the through-hole 13. Reference numerals 18a and 19 denote a bolt head and a bolthole, respectively.

An aluminum anodic oxide film is representative of the insulator 14.

Figure 2:
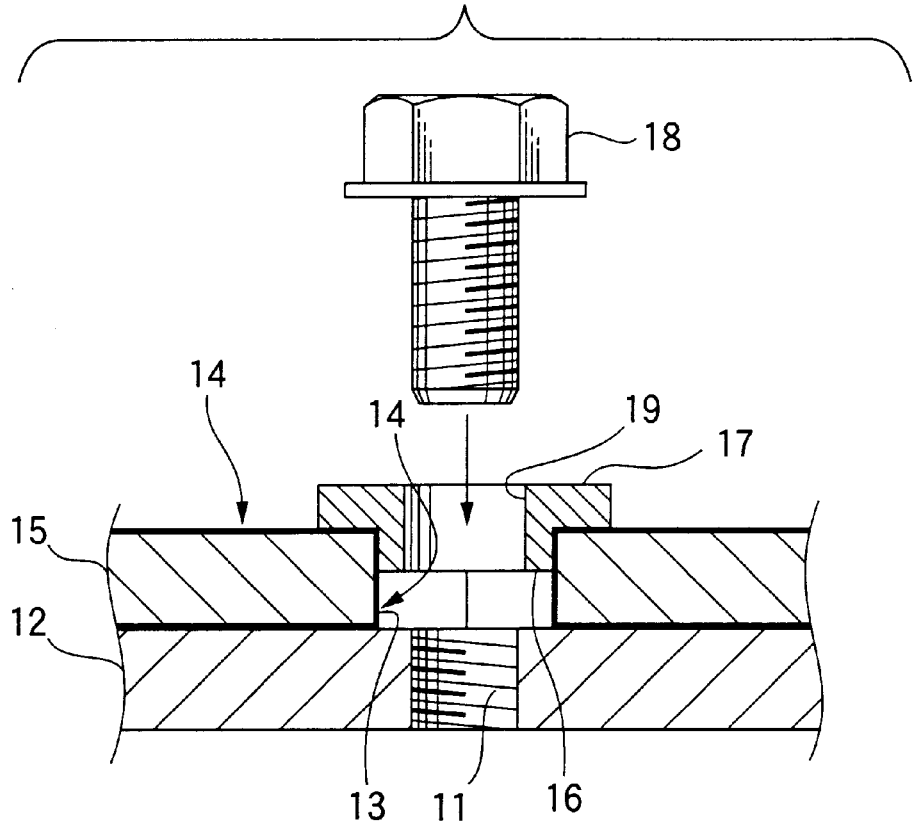
FIG. 2 is an illustration, showing how the bolting structure as illustrated in FIG. 1 is assembled.

FIG. 2 is an illustration, showing how the bolting structure as illustrated in FIG. 1 is assembled. The magnesium alloy member 15 is disposed on the conventional member 12. The washer 17 has the boss 16 held in snug engagement with the through-hole 13 of the magnesium alloy member 15. The bolt 18 is then inserted into the members 12, 15 from the top(the upper part of FIG. 2). At this time, threads of the bolt 18 at a distal or lower end thereof are not likely to contact the through-hole 13 because the through-hole 13 is sufficiently larger in size than the bolthole 19, and further because the boss 16 acts as a guide or guard member. As a result, there is no possibility of the insulator 14 being damaged by the inserted bolt 18.

In addition, the hexagonal (see FIG. 1) boss 16 engaged with the hexagonal (see FIG. 1) through-hole 13 precludes the washer 17 from being turned in union with the revolving bolt 18. Therefore, the washer 17 is not likely to damage or scratch the insulator 14.

Figure 3:
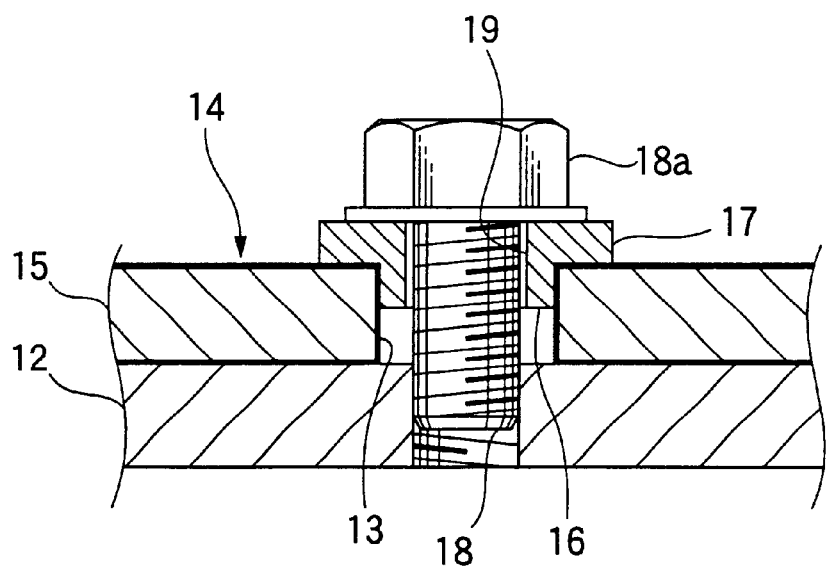
FIG. 3 is an exploded view, illustrating the bolting structure according to the first embodiment.

FIG. 3 is a cross-sectional view, illustrating the bolting structure according to the first embodiment. The non-magnesium alloy and conventional member 12 is disposed on the magnesium alloy member 15 that is coated with the insulator 14. The bolt 18 is initially inserted through the magnesium alloy member 15 and then into the conventional member 12, and the members 12, 15 are thereby bolted together. At this time, as a feature of the first embodiment, the washer 17 is disposed between the bolt head 18a and the magnesium alloy member 15. Another feature of the present embodiment is that the washer 17 includes the boss 16 as a lateral washer displacement-proof member for stopping the washer 17 from being laterally displaced. As a further feature of the present embodiment, the magnesium alloy member 15 is defined with the through-hole 13 that is greater in diameter than the bolthole 19.

As previously described, the conventional member 12 is formed with the threaded hole 11. Alternatively, the conventional member 12 may include a bolthole, through which the bolt 18 is inserted and then engaged with a counterpart or nut. This alternative is applicable in further embodiments that will be described below.

The hexagonal through-hole 13 is only required to lock the washer 17 against rotation. Thus, the through-hole 13 may have any cross-sectional shape, e.g., either a polygon such as a triangle, a quadrangle, and a pentagon, or a non-circle such as an ellipse and an oval. In short, the through-hole 13 may be of any shape, provided that the hole 13 is a non-circular hole including a polygonal hole.

FIG. 4 illustrates a variant of the embodiment as shown in FIG. 2. More specifically, a double-side adhesive tape 21 is added to the bolting structure as illustrated in FIG. 2. The other components are identical to those as shown in FIG. 2, and are identified by the same reference numerals; and, therefore, detailed descriptions related thereto will be omitted. In brief, the adhesive tape 21 having adhesives disposed on upper and lower sides thereof is affixed to a magnesium alloy member 15. A washer 17 is then secured to the tape 21. Alternatively, the tape 21 may, of course, be affixed to the washer 17 before the washer 17 is attached to the magnesium alloy member 15.

FIG. 5 illustrates a variant of the embodiment as shown in FIG. 3. More specifically, the adhesive tape 21 is added to the bolting structure as illustrated in FIG. 3. As a result, the bolting structure in FIG. 5 is expected to provide additional effects other than operation and effects as given in FIG. 3. More specifically, the washer 17 can be held against the magnesium alloy member 15 during assembly without allowing the washer 17 to rattle. This means that easy insertion of the bolt 18 is achievable. In addition, there is no likelihood that the washer 17 is dislodged from the magnesium alloy member 15 before the insertion of the bolt 18. As a result, efficient bolting is realized.

In addition, the double-side adhesive tape 21 present between the washer 17 and the magnesium alloy member 15 makes it feasible to prevent the occurrence of scratches in a more positive manner, which otherwise would be caused by the washer 17.

Furthermore, the adhesive tape 21 is possible to provide insulation between dissimilar metals, even when the insulator 14 suffers from film formation-related defects (a blister, cracking, and the like). In other words, the adhesive tape 21 is able to smooth out defects hat are present in the insulator 14.

Figure 6:
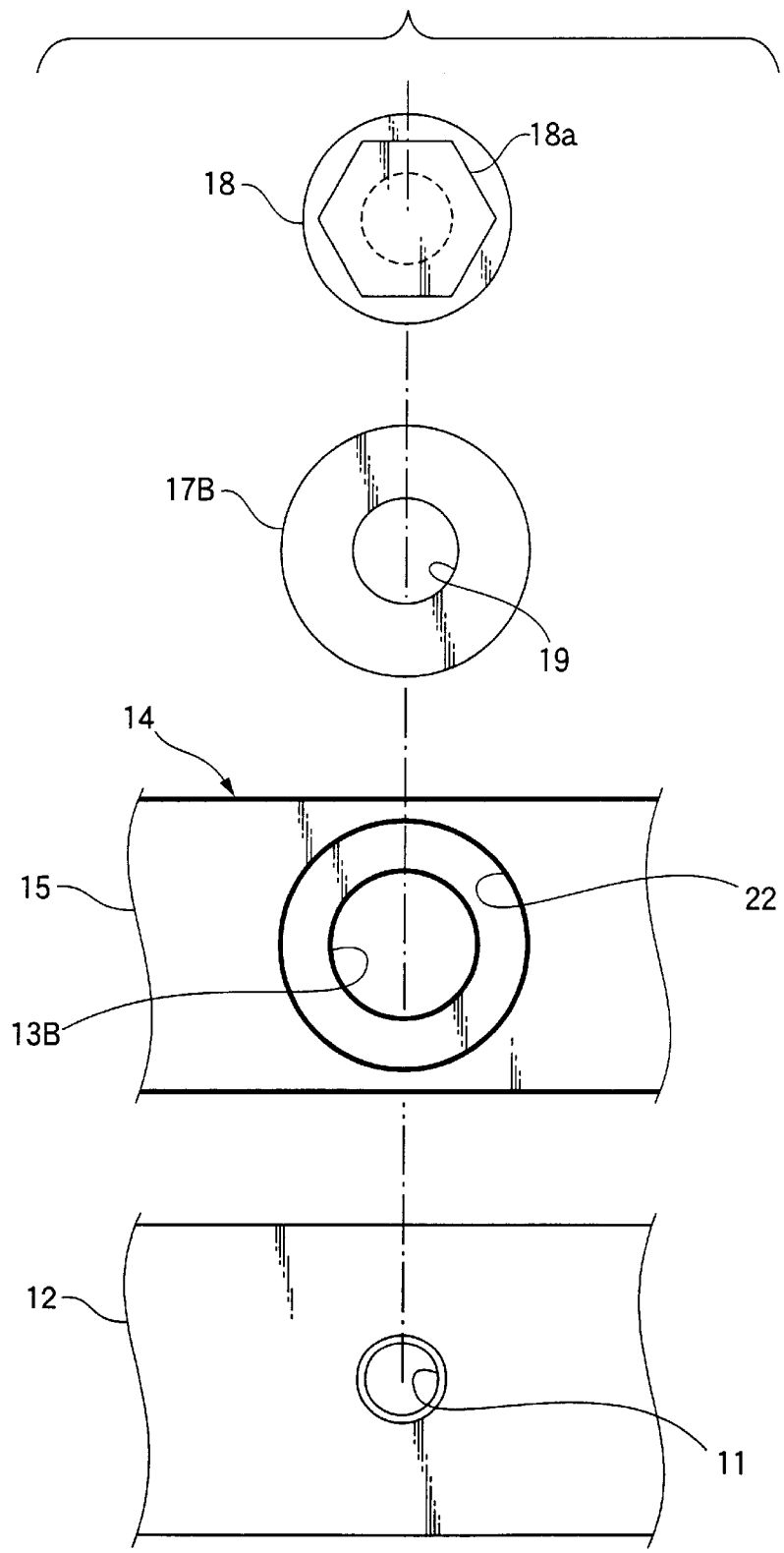
FIG. 6 is an exploded view, illustrating a bolting structure according to a second embodiment of the present invention.

FIG. 6 is an exploded view, illustrating a bolting structure according to a second embodiment of the present invention. The bolting structure according to the present embodiment includes a conventional member 12, a magnesium alloy member 15, a washer 17B, and a bolt 18. The conventional member 12 includes a threaded hole 11. The magnesium alloy member 15 includes a through-hole 13B that is sized as required. The magnesium alloy member 15 further includes a cylindrical concave 22. The concave 22 has a diameter slightly greater than an outer diameter of the washer 17B. The magnesium alloy member 15 is covered with an insulator 14. Reference numerals 18a and 19 denote a bolt head and a bolthole, respectively.

Figure 7:
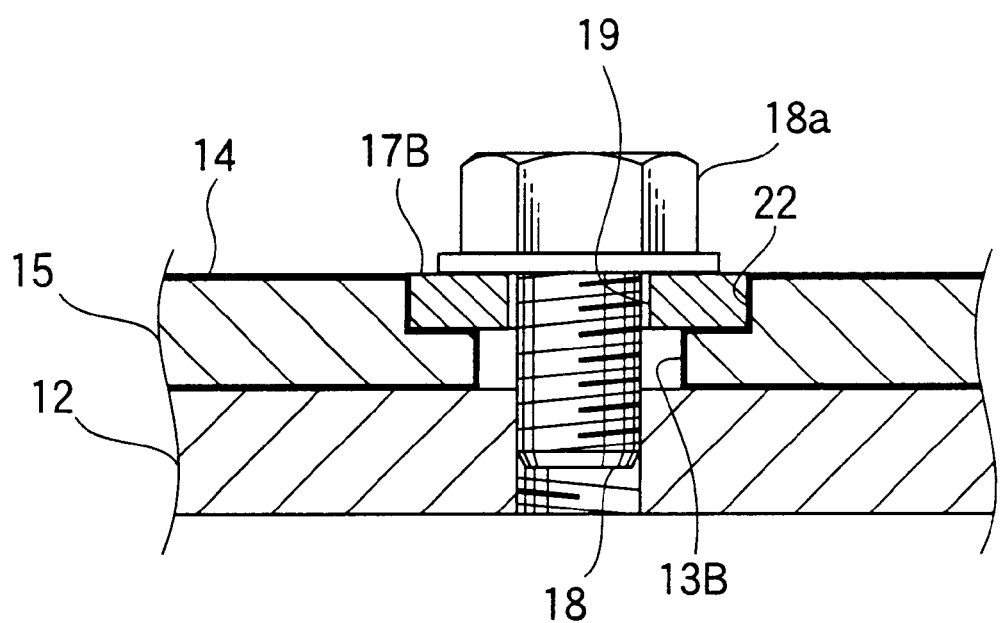
FIG. 7 is a cross-sectional view, illustrating the bolting structure according to the second embodiment.

FIG. 7 is a cross-sectional view, illustrating the bolting structure according to the second embodiment. The non-magnesium alloy and conventional member 12 is disposed on the magnesium alloy member 15 having the insulator 14 positioned thereon. The bolt 18 is initially inserted through the magnesium alloy member 15 and then into the conventional member 12, and the members 12, 15 are thereby bolted together. At this time, as a feature of the second embodiment, the washer 17B is disposed between the bolt head 18a and the magnesium alloy member 15. Another feature of the present embodiment is that the magnesium alloy member 15 includes the cylindrical concave 22 as a lateral washer displacement-proof member for preventing the washer 17B from being sideward displaced. As a further feature of the present embodiment, the magnesium alloy member 15 is formed with the through-hole 13B that is greater in diameter than the bolthole 19 of the washer 17B.

As illustrated by FIG. 7, the engagement of the washer 17B with the cylindrical concave 22 obviates a possibility of the washer 17B being sideward displaced. In addition, threads of the bolt 18 at a distal or lower end thereof are unlikely to contact the through-hole 13B because the through-hole 13B is sufficiently greater in size than the bolthole 19, and further because the washer 17B serves as a guide member. As a result, there is no chance of the insulator 14 being damaged by the inserted bolt 18.

The double-side adhesive tape is preferably disposed between the underside of the washer 17B and the bottom of the cylindrical concave 22. The presence of such an adhesive tape prevents the washer 17B from being rotated jointly with the bolt 18, and further eliminates a chance of the washer 17B being dislodged from the concave 22 before and during insertion of the bolt 18. As a result, efficient bolting is achievable.

Figure 8:
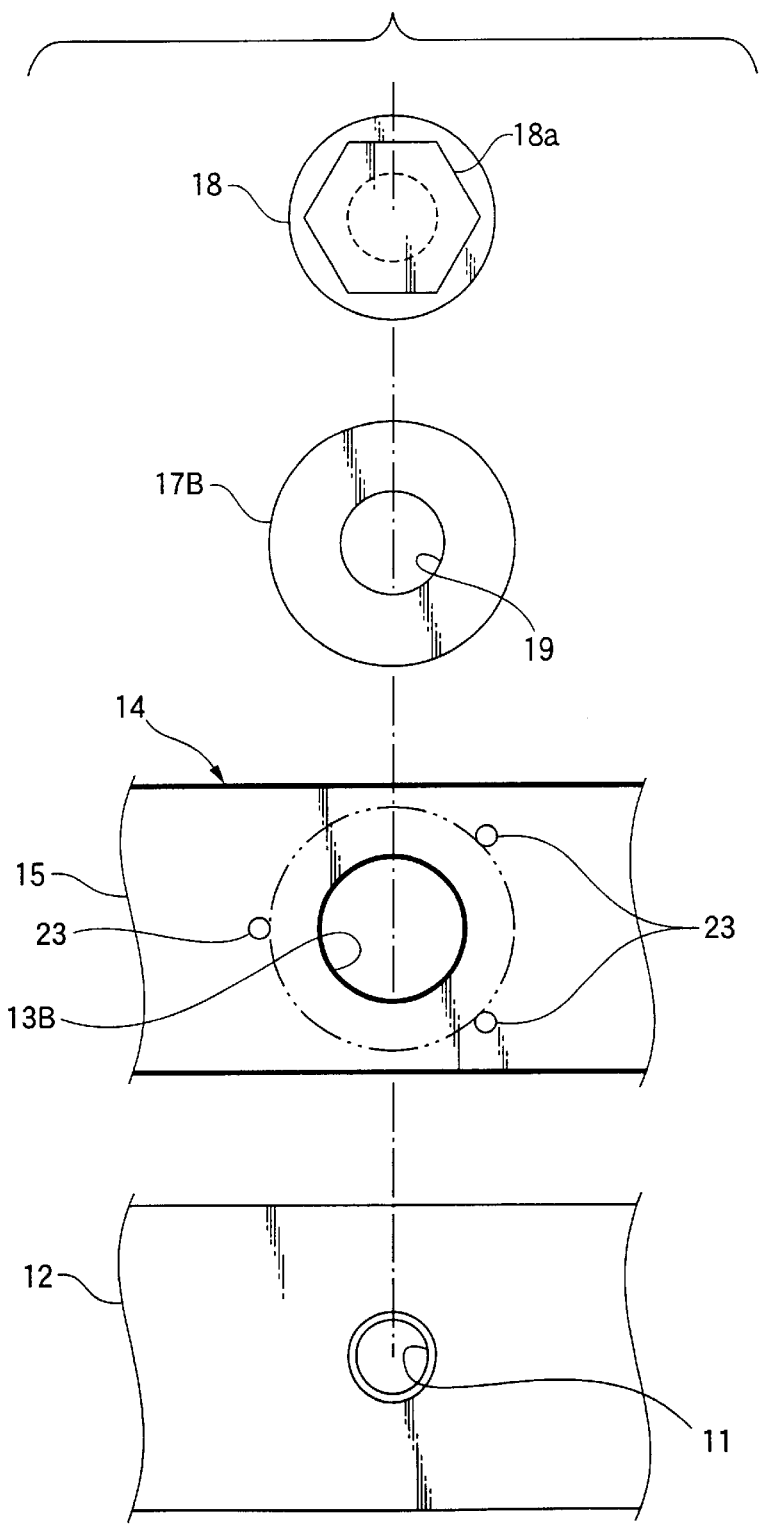
FIG. 8 is an exploded view, illustrating a bolting structure according to a third embodiment.

FIG. 8 is an exploded view, illustrating a bolting structure according to a third embodiment of the present invention. The bolting structure according to the present embodiment includes a conventional member 12, a magnesium alloy member 15, a washer 17B, and a bolt 18. The conventional member 12 includes a threaded hole 11. The magnesium alloy member 15 includes a through-hole 13B that is dimensioned as required. The magnesium alloy member 15 includes at least three protrusions 23 . . . (For the protrusions 23 . . . , the symbol " . . . " denotes a plurality of numbers, and will equally be provided hereinafter.) The protrusions 23 . . . project outward from the magnesium alloy member 15 in order to prevent the washer 17B as illustrated in imaginary line in FIG. 8 from being sideward displaced. The magnesium alloy member 15 is covered with an insulator 14. Reference numerals 18a and 19 denote a bolt head and a bolthole, respectively.

Figure 9:
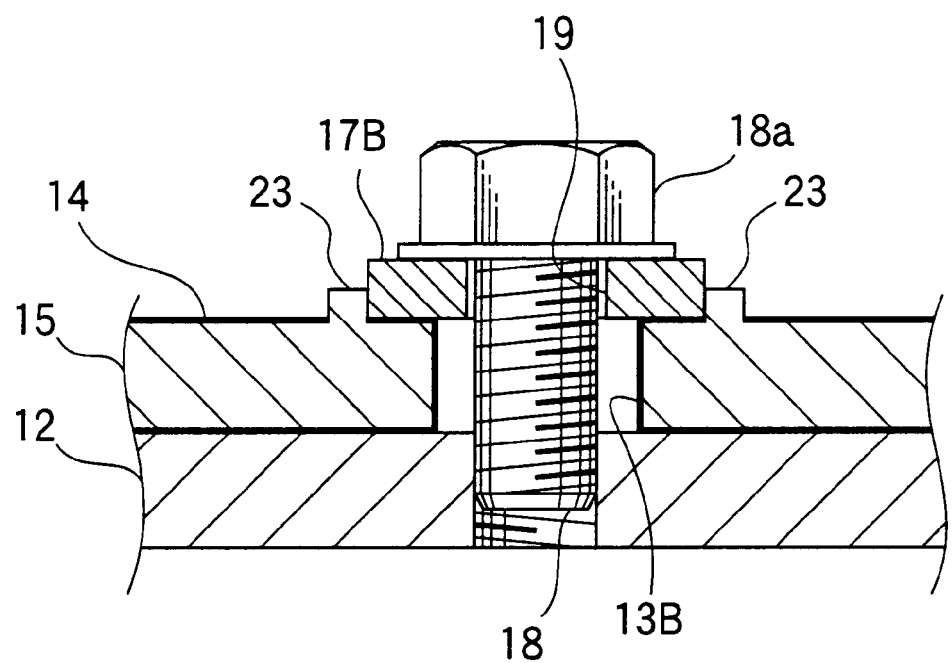
FIG. 9 is a cross-sectional view, showing the bolting structure according to the third embodiment.

FIG. 9 is a cross-sectional view, illustrating the bolting structure according to the third embodiment. The non-magnesium alloy and conventional member 12 is disposed on the magnesium alloy member 15 having the insulator 14 disposed thereon. The bolt 18 is initially inserted through the magnesium alloy member 15 and then into the conventional member 12, and the members 12, 15 are thereby bolted together. At this time, as a feature of the present embodiment, the washer 17B is disposed between the bolt head 18a and the magnesium alloy member 15. Another feature of the present embodiment is that the magnesium alloy member 15 includes the protrusions 23 as a lateral washer displacement-proof member for stopping the washer 17B from being laterally displaced. As a further feature of the present embodiment, the magnesium alloy member 15 is formed with the through-hole 13B that is greater in diameter than the bolthole 19 of the washer 17B.

As seen from FIG. 9, the washer 17B is engaged between the protrusions 23 . . . Accordingly, there is no chance of the washer 17B being laterally moved. In addition, threads of the bolt 18 at a distal or lower end thereof are unlikely to contact the through-hole 13B because the through-hole 13B is sufficiently greater in size than the bolthole 19, and further because the washer 17B functions as a guide member. As a result, the bolt 18 can be inserted without a likelihood of the insulator 14 being damaged thereby.

It is to be noted that four protrusions 23 or five or more protrusions 23 may be provided, but three protrusions 23 . . . are sufficient to preclude lateral displacement of the washer 17B.

The double-side adhesive tape is preferably disposed between the underside of the washer 17B and the top of the magnesium alloy member 15. The presence of such an adhesive tape locks the washer 17B against rotation in union with the turning bolt 18, and further eliminates a possibility of the washer 17B being dislodged from the magnesium alloy member 15 before and during insertion of the bolt 18. As a result, efficient bolting is achievable.

FIG. 10 is an exploded view, illustrating a bolting structure according to a fourth embodiment of the present invention. The bolting structure according to the present embodiment includes a conventional member 12, a magnesium alloy member 15, a washer 17C, a double-side adhesive tape 24, and a bolt 18. The conventional member 12 includes a threaded hole 11. The magnesium alloy member 15 includes a through-hole 13C that is dimensioned as required. The magnesium alloy member 15 is covered with an insulator 14. The adhesive tape 24 is equal in outer diameter to the washer 17C. Reference numerals 18a and 19 denote a bolt head and a bolthole, respectively.

FIG. 11 is a cross-sectional view, illustrating the bolting structure according to the fourth embodiment. The non-magnesium alloy and conventional member 12 is disposed on the magnesium alloy member 15 having the insulator 14 provided thereon. The bolt 18 is initially inserted through the magnesium alloy member 15 and then into the conventional member 12, and the members 12, 15 are thereby fastened together. At this time, as a feature of the present embodiment, the washer 17C is disposed between the bolt head 18a and the magnesium alloy member 15. Another feature of the present embodiment is that the adhesive tape 24 is disposed between the magnesium alloy member 15 and the washer 17C as a lateral washer displacement-proof member for preventing the washer 17C from being sideward displaced. As a further feature of the present embodiment, the magnesium alloy member 15 is formed with the through-hole 13C that is greater in diameter than the bolthole 19 of the washer 17C.

As seen from FIG. 11, the adhesive tape 24 permits the washer 17C to be affixed to the magnesium alloy member 15. Accordingly, there is no chance that the washer 17C is neither laterally displaced nor rotated. In addition, threads of the bolt 18 at a distal or lower end thereof are unlikely to contact the through-hole 13C because the through-hole 13C is sufficiently greater in size than the bolthole 19, and further because the washer 17C acts as a guide member. As a result, the bolt 18 can be inserted without a likelihood of the insulator 14 being scratched thereby.

It is to be noted that the lateral washer displacement-proof member as described above embodiments is applicable when it is one of components as set forth in the embodiments, such as the boss, the cylindrical concave, and the protrusions, a combination thereof, and equivalents thereto.

The adhesive tape is preferably an insulative tape having adhesive agents positioned on upper and lower sides thereof.

Pursuant to the present invention, the above-described construction provides effects as set forth below.

The invention provides a bolting structure for a magnesium alloy member, having a non-magnesium alloy and conventional member disposed on the magnesium alloy member, the magnesium alloy member being covered with an insulator, and a bolt initially inserted through the magnesium alloy member and then into the conventional member, thereby permitting the conventional member and the magnesium alloy member to be bolted together, the bolting structure comprising: a washer attached to the magnesium alloy member; and, a lateral washer displacement-proof member for preventing lateral displacement of the washer, thereby holding the washer in desirable position, wherein the magnesium alloy member has a through-hole sufficiently made greater than a bolthole of the washer. This construction eliminates a chance that the bolt at a distal end thereof contacts the through-hole. The insulator remains intact because of non-contact of the bolt with the through-hole. As a result, no stray current corrosion occurs.

Next, the invention provides a bolting structure for a magnesium alloy member, wherein the through-hole is any non-circular hole, including a polygonal hole, designed to lock the washer against rotation. Since the washer rotated jointly with the bolt scratches the insulator, a member is provided for locking the washer against rotation in order to prevent the occurrence of scratches. Such a simplified structure is able to prevent stray current corrosion successfully.

In addition, the boss integrally formed on the washer is engaged with the through-hole, thereby holding the washer in position, which otherwise would be moved sideward. Alternatively, the engagement of the washer with the cylindrical concave holds the washer in position, which otherwise would be displaced laterally. Furthermore, a plurality of protrusions disposed about the washer holds the washer in position, which otherwise would be displaced sideward. Such a simplified construction is able to positively prevent the stray current corrosion.

Further, the washer is affixed to the magnesium alloy member through a double-side adhesive. This construction makes it feasible to hold the washer in position, which otherwise would be dislodged from the magnesium alloy member, to lock the washer against rotation, and to provide enhanced insulating performance. As a result, a low cost means for reliably smoothing out stray current corrosion is provided.

Furthermore, the washer is affixed to the magnesium alloy member by means of the adhesive tape. This construction makes it feasible to hold the washer in position, which otherwise would result in lateral displacement, rotation, and dislodgement from the magnesium alloy member. As a result, a low cost means for combating stray current corrosion successfully is provided.

What is claimed is:
1. A bolting structure comprising:
   a magnesium alloy member;
   a non-magnesium alloy and conventional member disposed on said magnesium alloy member;
   an insulator which covers said magnesium alloy member;
   a bolt initially inserted through said magnesium alloy member into said conventional member to permit said conventional member and said magnesium alloy member to be bolted together;
   a washer disposed between a head of said bolt and said magnesium alloy member; and
   a lateral washer displacement-proof member which prevents said washer from being laterally displaced and is positioned either one of on said washer, on said magnesium alloy member, and between said washer and said magnesium alloy member, wherein said magnesium alloy member is formed with a through-hole that is greater in diameter than a bolt hole provided in said washer.

2. The bolting structure according to claim 1, wherein said through-hole have a cross-sectional shape being any non-circular hole, including a polygonal hole, designed to lock said washer against rotation.

3. The bolting structure according to claim 1, wherein said lateral washer displacement-proof member is a boss, wherein said boss having an outer diameter slightly smaller than a diameter of said through-hole.

4. The bolting structure according to claim 1, wherein said lateral washer displacement-proof member is a cylindrical concave, wherein said cylindrical concave having a diameter slightly greater than an outer diameter of said washer.

5. The bolting structure according to claim 1, wherein said lateral washer displacement-proof member is at least three protrusions, wherein said protrusions project outward from said magnesium alloy member in order to prevent lateral displacement of said washer.

6. The bolting structure according to claim 3, wherein said washer is affixed to said magnesium alloy member through a double-side adhesive tape.

7. The bolting structure according to claim 1, wherein said lateral washer displacement-proof member is a double-side adhesive tape for affixing said washer to said magnesium alloy member.

8. The bolting structure according to claim 1, wherein said through-hole have cross-sectional shape being any one of a triangle, a quadrangle, a pentagon, an ellipse and an oval.

* * * * *